United States Patent
Lee

(10) Patent No.: US 9,484,566 B2
(45) Date of Patent: Nov. 1, 2016

(54) BATTERY PACK

(71) Applicant: Samsung SDI Co., Ltd., Yongin-si, Gyeonggi-do (KR)

(72) Inventor: Hyunsoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/323,966

(22) Filed: Jul. 3, 2014

(65) Prior Publication Data
US 2015/0214530 A1 Jul. 30, 2015

(30) Foreign Application Priority Data

Jan. 28, 2014 (KR) .................. 10-2014-0010679

(51) Int. Cl.
| | |
|---|---|
| *H01M 2/24* | (2006.01) |
| *H01M 2/20* | (2006.01) |
| *H01M 2/30* | (2006.01) |
| *H01M 2/10* | (2006.01) |

(52) U.S. Cl.
CPC ........... *H01M 2/202* (2013.01); *H01M 2/1016* (2013.01); *H01M 2/206* (2013.01); *H01M 2/30* (2013.01); *H01M 2/305* (2013.01); *Y10T 29/49108* (2015.01)

(58) Field of Classification Search
CPC ...... H01M 2/30; H01M 2/202; H01M 2/203; H01M 2/305; H01M 2/1016
See application file for complete search history.

(56) References Cited

U.S. PATENT DOCUMENTS

2011/0305943 A1  12/2011  Byun et al.

FOREIGN PATENT DOCUMENTS

| DE | 10 2010 029 011 A1 | 11/2011 |
|---|---|---|
| DE | 10 2010 031 457 A1 | 1/2012 |
| EP | 2 393 144 A1 | 12/2011 |
| JP | 2001-338632 A | 12/2001 |
| JP | 2005-327677 A | 11/2005 |
| JP | 2007-323952 | 12/2007 |
| JP | 2007-324004 A | 12/2007 |

OTHER PUBLICATIONS

EPO Search Report dated Jun. 11, 2015, for corresponding European Patent application 14194524.6, (7 pages).
English machine translation of Japanese Publication 2007-323952 dated Dec. 13, 2007, listed above, (22 pages).

*Primary Examiner* — Jane Rhee
(74) *Attorney, Agent, or Firm* — Lewis Roca Rothgerber Christie LLP

(57) ABSTRACT

A battery pack includes a plurality of secondary batteries, each including a first electrode terminal and a second electrode terminal protruding from a cap plate, and a plurality of busbars, each electrically coupling first electrode terminal of one of the secondary batteries and the second electrode terminal of an adjacent one of the secondary batteries, wherein the busbars and the second electrode terminals are forcibly deformed to be coupled to each other, and wherein the busbars are welded to the first electrode terminals.

15 Claims, 5 Drawing Sheets

BATTERY PACK

CROSS-REFERENCE TO RELATED APPLICATION

This application claims priority to and the benefit of Korean Patent Application No. 10-2014-0010679, filed on Jan. 28, 2014 in the Korean Intellectual Property Office, the entire content of which is incorporated herein by reference.

BACKGROUND

1. Field

Aspects of the present invention relate to a battery pack.

2. Description of the Related Art

In general, unlike a primary battery which is not designed to be recharged, a secondary battery is capable of being repeatedly charged and discharged. A low-capacity secondary battery composed of a single battery cell is used as a power source for various small, portable electronic devices, such as cellular phones, notebook computers, cameras, and camcorders. A high-capacity secondary battery in which a plurality of battery cells are coupled to (e.g., connected to) each other in a pack structure is used as a power source for driving a motor of a hybrid electric vehicle (HEV), an electric vehicle (EV), and the like.

Several to several tens of secondary battery cells may be mounted in a battery unit and coupled to each other to form a battery pack. A plurality of battery cells may be coupled to (e.g., connected to) one another via a busbar to form the battery pack. In the secondary battery cells, aluminum or an aluminum alloy may be used as a positive electrode terminal and copper or a copper alloy may be used as a negative electrode terminal. The busbar is welded to respective negative electrode terminals and positive electrode terminals of adjacent ones of the plurality of secondary batteries to couple the plurality of secondary batteries to each other in series to form a large-capacity battery pack. However, when the busbar is made of a metal, such as copper or aluminum, it is difficult to weld different kinds of metals to each other. To overcome the problem, the busbar may be formed of clad metal including copper and/or aluminum. In this case, however, because the clad metal busbar is expensive, the manufacturing cost may increase. However, copper-copper laser welding is complicated, making it difficult to achieve the laser welding.

SUMMARY

Aspects of the present invention provide a battery pack which can reduce the manufacturing cost by using a busbar made of a single metal.

Other aspects of the present invention provide a battery pack which can prevent connection failures due to complexities of welding different kinds of metals to each other by coupling a busbar and an electrode terminal, which are made of different kinds of metals such that welding thereof is not easy to achieve, using deformation (e.g., thermoplastic deformation) by applying pressure using a pressing device.

One embodiment of the present invention provides a battery pack including a plurality of secondary batteries, each having a first electrode terminal and a second electrode terminal protruding from a cap plate, and a plurality of busbars, each electrically coupling the first electrode terminal of one of the secondary batteries and the second electrode terminal of an adjacent one of the secondary batteries, wherein the busbars and the second electrode terminals are forcibly deformed to be coupled to each other, and wherein the busbars welded to the first electrode terminals.

Each of the busbars may include a first connection part coupled to the first electrode terminal, and may include a second connection part couple to the second electrode terminal, and a portion of each of the busbars between the first connection part and the second connection part is bent.

The first electrode terminal may have a planar surface at a top surface of the cap plate, and the second electrode terminal may protrude above the top surface of the cap plate, and the second electrode terminal may have a planar first surface and a second surface that is opposite to the first surface.

The first surface of the first electrode terminal may be parallel with the cap plate, and the first and second surfaces of the second electrode terminal may be perpendicular to the cap plate.

The first and second surfaces of the second electrode terminal may extend parallel with a widthwise direction of the cap plate.

The first connection part and the second connection part of the busbar may be perpendicular to each other.

The busbar and the second electrode terminal may be coupled to each other a clinching process, a pressing process, or a riveting process.

The busbar and the second electrode terminal may include metals that are different from each other.

The busbar may have a protrusion extending from a surface of the busbar, and the second electrode terminal may have a recess that corresponds to the protrusion of the bus bar.

The busbar and the first electrode terminal may include the same metal.

The busbar and the first electrode terminal may include aluminum or an aluminum alloy.

Each of the plurality of secondary batteries may further include an electrode assembly including a first electrode plate electrically coupled to the first electrode terminal and a second electrode plate electrically coupled to the second electrode terminal, and a case accommodating the electrode assembly therein and having a top opening.

The cap plate may seal the top opening of the case, and the first electrode terminal and the second electrode terminal may protrude from the cap plate.

The first electrode terminal and the second electrode terminal may have shapes that are different from each other.

Another embodiment of the present invention provides a method of forming a battery pack including a plurality of secondary batteries and a plurality of busbars. Each of the secondary batteries includes a first electrode terminal and a second electrode terminal. The method includes: arranging the secondary batteries along a line such that the first electrode terminal of one of the secondary batteries is adjacent to the second electrode terminal of an adjacent one of the secondary batteries; and electrically coupling adjacent ones of the secondary batteries to each other with a busbar, wherein the electrically coupling of the ones of the adjacent secondary batteries includes welding a first connection part of the busbar to the first electrode terminal of one of the adjacent secondary batteries and coupling a second connection part of the busbar to the second electrode terminal of another one of the adjacent secondary batteries by applying pressure to the second connection part and the second electrode terminal to deform them.

As described above, the battery pack according to embodiments of the present invention can reduce the manufacturing cost by using a busbar made of a single metal.

In addition, the battery pack according to embodiments of the present invention can prevent connection failures due to the complexities of welding different kinds of metals to each other by coupling a busbar and an electrode terminal, which are made of different kinds of metals such that welding thereof is not easy to achieve, using deformation (e.g., thermoplastic deformation) by applying pressure using a pressing device (e.g., a press-in device).

Additional aspects and/or characteristics of the invention will be set forth in part in the description which follows and, in part, will be obvious from the description or may be learned by practice of the invention.

BRIEF DESCRIPTION OF THE DRAWINGS

The objects, features, and characteristics of embodiments of the present invention will become more apparent from the following detailed description in conjunction with the accompanying drawings, in which.

DETAILED DESCRIPTION

Figure 1:
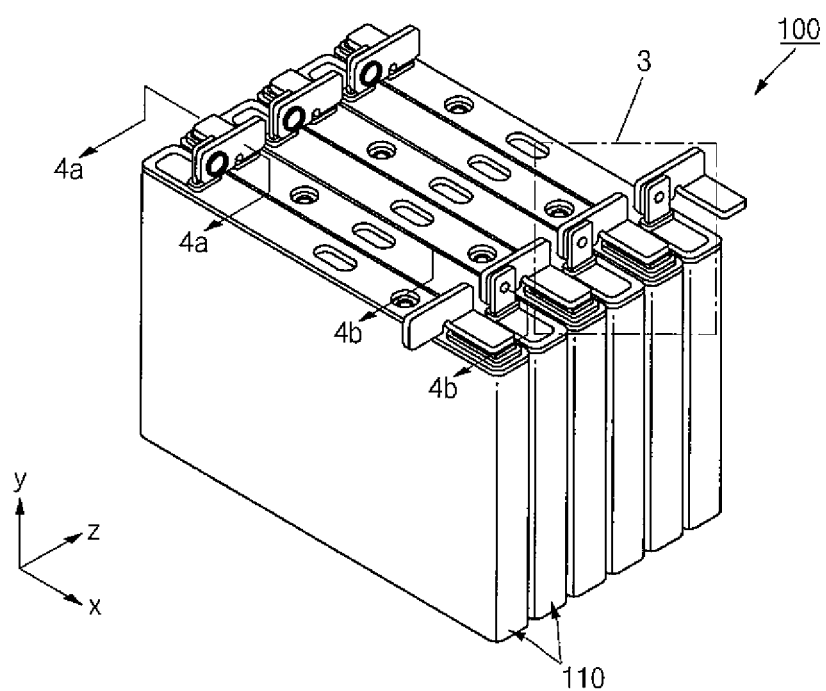
FIG. 1 is a perspective view of a battery pack according to an embodiment of the present invention.

Hereinafter, a battery pack according to an example embodiment of the invention will be described in detail with reference to the accompanying drawings; however, the present invention may be embodied in different forms and should not be construed as limited to the embodiments set forth herein. Rather, these embodiments are provided so that this disclosure will be thorough and complete and will fully convey the scope of the disclosure to those skilled in the art.

In the drawings, the thickness of layers and regions may be exaggerated for clarity. Like numbers refer to like elements throughout. As used herein, the term "and/or" includes any and all combinations of one or more of the associated listed items. Further, the use of "may" when describing embodiments of the present invention relates to "one or more embodiments of the present invention."

The terminology used herein is for the purpose of describing particular embodiments only and is not intended to be limiting of the invention. As used herein, the singular forms are intended to include the plural forms as well, unless the context clearly indicates otherwise. It will be further understood that the terms "includes," "including," "comprise," and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers, and/or parts, these members, elements, regions, layers, and/or parts should not be limited by these terms. These terms are only used to distinguish one member, element, region, layer, and/or part from another member, element, region, layer, and/or part. Thus, for example, a first member, element, region, layer, and/or part discussed below could be termed a second member, element, region, layer, and/or part without departing from the teachings of the present invention.

Figure 2:
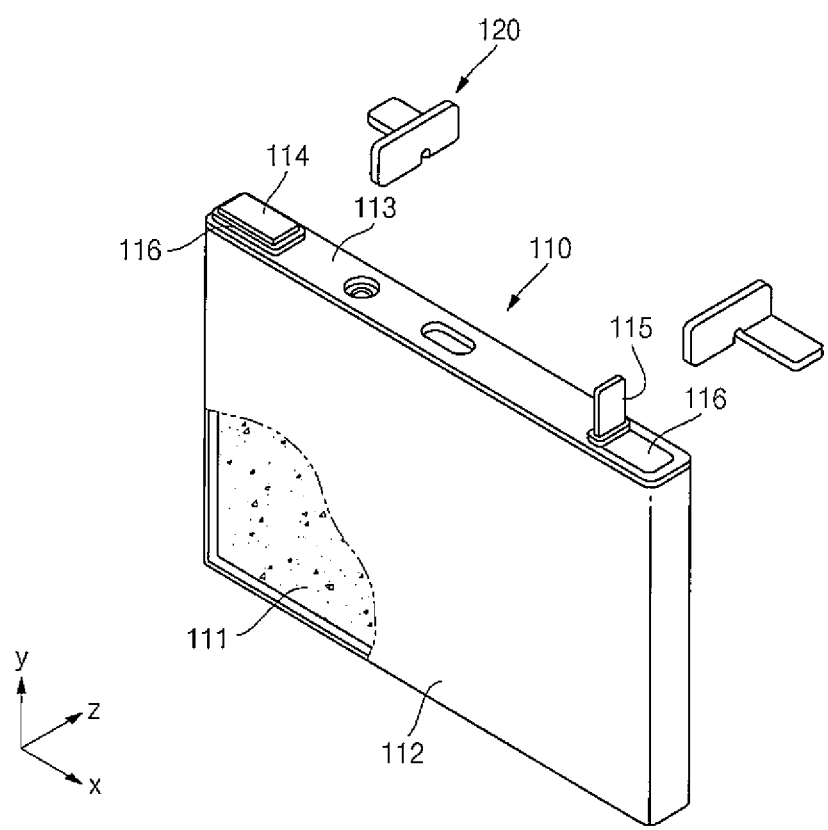
FIG. 2 is a perspective view of a single secondary battery of the battery pack shown in FIG. 1.
Figure 3:
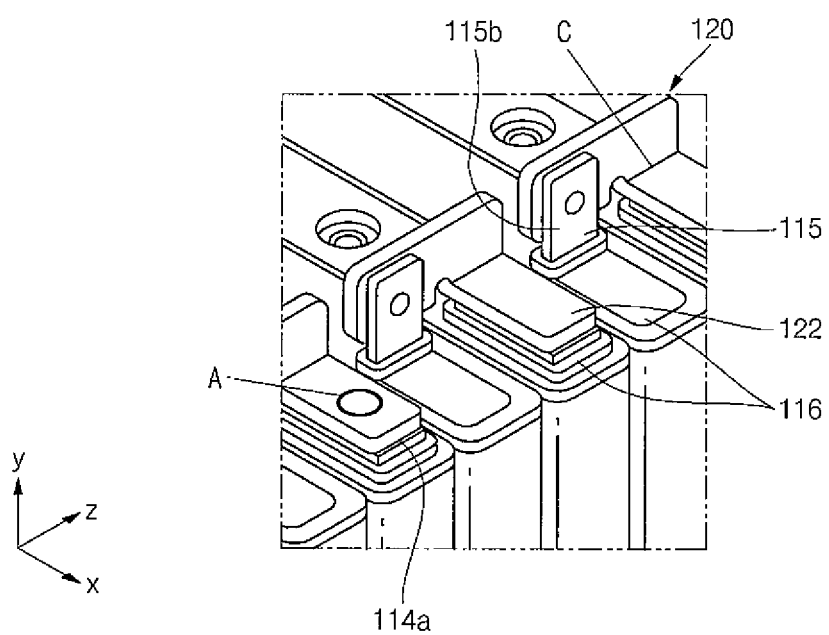
FIG. 3 is an enlarged perspective view illustrating the portion 3 of FIG. 1.
Figure 4A:
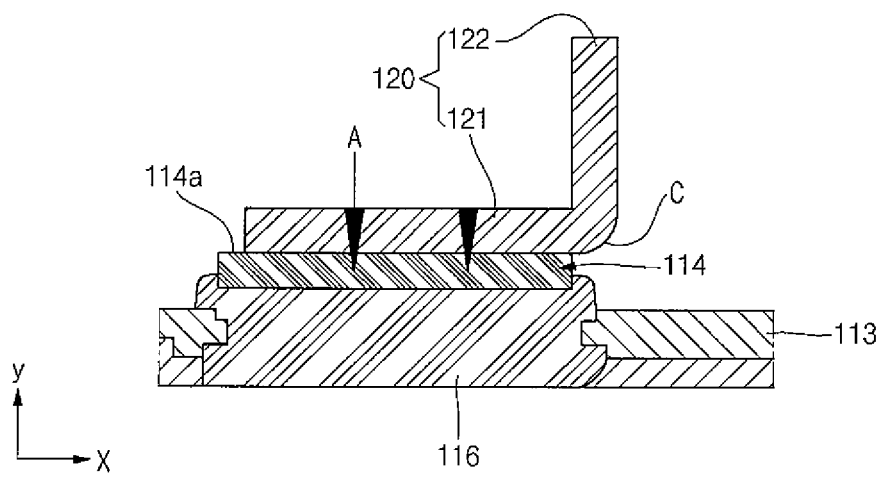
FIGS. 4A and 4B are cross-sectional views taken along the lines 4a-4a and 4b-4b of FIG. 1, respectively.
Figure 4B:
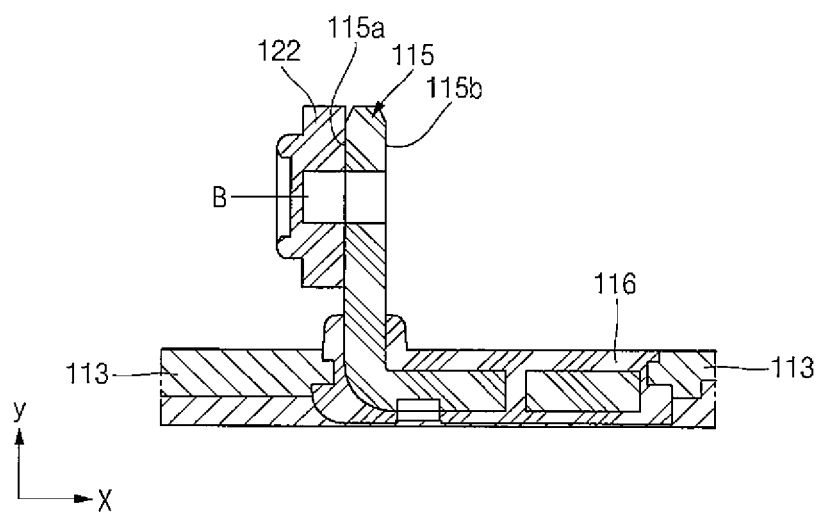

FIG. 1 is a perspective view of a battery pack according to an embodiment of the present invention, FIG. 2 is a perspective view of a single secondary battery of the battery pack shown in FIG. 1, FIG. 3 is an enlarged perspective view illustrating the portion 3 of FIG. 1, and FIGS. 4A and 4B are cross-sectional views taken along the lines 4a-4a and 4b-4b, respectively, of FIG. 1. Hereinafter, the battery pack according to an embodiment of the present invention will be described with reference to FIGS. 1 to 4B.

As shown in FIG. 1, the battery pack 100 includes a plurality of secondary batteries 110 and a plurality of busbars 120. While the battery pack 100 illustrated in FIG. 1 illustrates that six secondary batteries 110 are included in the battery pack 100, the number of secondary batteries included in a battery pack may vary according to the desired capacity and/or intended use of the battery pack, and aspects of the present invention are not limited thereto.

First, as shown in FIG. 2, each of the secondary batteries 110 includes an electrode assembly 111 having a first electrode plate and a second electrode plate stacked or wound with a separator therebetween, a case 112 having the electrode assembly 111 accommodated therein and having a top opening, a cap plate 113 sealing the top opening of the case 112, and electrode terminals 114 and 115 electrically coupled to (e.g., electrically connected to) the first electrode plate and the second electrode plate, respectively, and protruding to the outside of the cap plate 113.

The electrode assembly 111 is accommodated in the case 112 along with an electrolyte. The electrolyte may include an organic solvent, such as EC (ethylene carbonate), PC (propylene carbonate), DEC (diethyl carbonate), EMC (ethyl methyl carbonate), or DMC (dimethyl carbonate), and a lithium salt, such as lithium hexafluorophosphate ($LiPF_6$) or lithium tetrafluoroborate ($LiBF_4$). In addition, the electrolyte may be in a liquid, solid, or gel phase.

The case 112 may be made of a conductive metal, such as aluminum, an aluminum alloy, or nickel plated steel. In addition, the case 112 may have a hexahedron shape or another shape capable of housing (e.g., accommodating) the electrode assembly 111 in an inner space thereof.

The electrode assembly 111 is accommodated in the inner space of the case 112, and the cap plate 113 is then coupled to the top opening of the case 112. Here, the cap plate 113 may have one or more openings (e.g., holes) formed therein to allow the electrode terminals 114 and 115 to protrude to a top portion of the cap plate 113 (e.g., to protrude above the cap plate 113). A gasket 116 for electrically insulating and hermetically sealing the electrode terminals 114 and 115 may be further provided between the openings of the cap plate 113 and the electrode terminals 114 and 115.

The electrode terminals 114 and 115 include a first electrode terminal 114 electrically coupled to the first electrode plate of the electrode assembly 111 in the case 112 and a second electrode terminal 115 electrically coupled to the second electrode plate of the electrode assembly 111 in the case 112. That is to say, the first electrode terminal 114 and the second electrode terminal 115 are electrode terminals having polarities that are different from each other.

In each of the secondary batteries 110, the first electrode terminal 114 and the second electrode terminal 115 protrude to the top portion of the cap plate 113 in a state in which they have (e.g., maintain) a distance (e.g., a predetermined distance) therebetween in a lengthwise direction x of the cap plate 113. The first electrode terminal 114 and the second electrode terminal 115 have shapes that are different from each other such that the first electrode terminal 114 has one surface parallel with the cap plate 113 (e.g., a substantially flat surface parallel to a surface of the cap plate 113) and the second electrode terminal 115 has a planar surface protruding perpendicular to the cap plate 113 (e.g., the second electrode terminal extends perpendicularly with respect to the surface of the cap plate 113).

The first electrode terminal 114 has a rectangular plate shape extending in the lengthwise direction x of the cap plate 113 (e.g., the first electrode terminal 114 has a top surface that extends in the lengthwise direction x and a widthwise direction z of the cap plate 113). The first electrode terminal 114 has a first surface 114a upwardly protruding from the cap plate 113. The first surface 114a of the first electrode terminal 114 is welded to a first connection part 121 (e.g., a first connection portion) of the busbar 120. The first electrode terminal 114 is made of aluminum and/or an aluminum alloy.

The second electrode terminal 115 has a rectangular plate shape standing (e.g., extending) in an upward direction y which is perpendicular to a top surface of the cap plate 113 (e.g., the upward direction y is perpendicular to both the lengthwise direction x and the widthwise direction z). The second electrode terminal 115 is configured such that a first surface 115a and a second surface 115b that is opposite to the first surface 115a upwardly extend from and protrude above the cap plate 113. The second electrode terminal 115 is configured such that the first surface 115a faces the first electrode terminal 114. That is to say, the first surface 115a and the second surface 115b of the second electrode terminal 115 are arranged along (e.g., extend along) the widthwise direction z of the cap plate 113 which is perpendicular to the lengthwise direction x of the cap plate 113. The second electrode terminal 115 is deformed (e.g., thermally deformed) by applying pressure (e.g., predetermined pressure) thereto in a state in which it is superposed with a second connection part 122 of the busbar 120 to be coupled to (e.g., connected to) the second connection part 122. The second electrode terminal 115 may be made of copper and/or a copper alloy.

In each of the plurality of secondary batteries 110, the first electrode terminal 114 and the second electrode terminal 115 are alternately arranged such that first electrode terminals 114 and second electrode terminals 115 of adjacent secondary batteries 110 are adjacent to each other, thereby forming a terminal row. The terminal row may correspond to a line (e.g., a terminal line) formed by terminals having opposite polarities arranged along a line. That is to say, the arrangement of the plurality of secondary batteries 110 in the battery pack 100 may form two terminal rows.

The busbar 120 electrically couples the first electrode terminal 114 of each of the plurality of secondary batteries 110 to the second electrode terminal 115 of an adjacent one of the secondary batteries 110 arranged along the same terminal row. In addition, the busbar 120 electrically couples the second electrode terminal 115 of each of the plurality of secondary batteries 110 to the respective first electrode terminal 114 of an adjacent one of the secondary batteries 110 arranged along the same terminal row. That is to say, the busbar 120 electrically couples the electrode terminals 114 and 115 having polarities that are different from each other of adjacent secondary batteries 110 arranged along the same terminal row to each other.

The busbar 120 includes the first connection part 121 coupled to the first electrode terminal 114 and the second connection part 122 coupled to the second electrode terminal 115. The first connection part 121 and the second connection part 122 may be integrally formed with each other in the busbar 120. The busbar 120 includes a corner part C, that is, a bent part (e.g., a bent portion) between (e.g., coupling) the first connection part 121 and the second connection part 122. The first connection part 121 and the second connection part 122 may be bent to be perpendicular to each other (e.g., the first connection part 121 and the second connection part 122 may be bent about the corner part C). The second connection part 122 is bent at the first connection part 121 that is coupled to the first electrode terminal 114 of the secondary battery 110 and extends (e.g., extends a length or a predetermined length) to be coupled to the second electrode terminal 115 of an adjacent secondary battery 110.

The busbar 120 may be made of the same metal as that of the first electrode terminal 114 and may be made of a metal different than that of the second electrode terminal 115. For example, the busbar 120 may be made of aluminum and/or an aluminum alloy.

The first connection part 121 has a planar plate shape covering the first surface 114a of the first electrode terminal 114 that extends in the lengthwise direction x of the cap plate 113. The first connection part 121 is electrically coupled to the first surface 114a of the first electrode terminal 114 using, for example, laser welding. The first connection part 121 is melted by a laser irradiated toward a top portion of the first connection part 121 to then be coupled to the first electrode terminal 114 in a state in which it covers the first surface 114a of the first electrode terminal 114. Here, the laser irradiated toward the top portion of the first connection part 121 penetrates the first connection part 121 to reach the first surface 114a of the first electrode terminal 114, so that the melted first connection part 121 and the first electrode terminal 114 are coupled to each other as indicated by reference character A. The laser may be vertically irradiated in a circular manner (e.g., along a circular pattern) toward the top portion of the first connection part 121, but aspects of the present invention are not limited thereto. The busbar 120 and the first electrode terminal 114 are made of the same metal based on flexible aluminum, thereby facilitating laser welding therebetween.

The second connection part 122 has a plate shape covering the first surface 115a of the second electrode terminal 115 that extends in the widthwise direction z of the cap plate 113. The second connection part 122 covers the first surface 115a of the second electrode terminal 115 and extends toward (e.g., extends a distance or predetermined distance toward) the first connection part 121 so that a portion of a lower corner of the second connection part 122 is coupled to the first connection part 121. That is to say, the second connection part 122 is bent at the first connection part 121 and extends (e.g., extends a length of predetermined length) to be coupled to the second electrode terminal 115.

The second connection part 122 is deformed (e.g., thermally deformed) by applying pressure (e.g., predetermined pressure) in a direction from the second surface 115b of the second electrode terminal 115 toward the first surface 115a of the second electrode 115 (e.g., a -x direction) in a state in which the second connection part 122 is superposed with the first surface 115a of the second electrode terminal 115 to be coupled to the second electrode terminal 115 (e.g., the second connection part 122 may be deformed to have a protrusion extending from a surface opposite a surface thereof contacting the first surface 115a of the second electrode 115, and the second electrode 115 may have a recess extending in the direction from the second surface 115b towards the first surface 115a). Here, a direction in which the pressure is applied to couple the second connection part 122 and the second electrode terminal 115 to each other may also be a direction from the second connection part 122 toward the second electrode terminal 115 (e.g., the x direction), but aspects of the present invention are not limited thereto.

Figure 5:
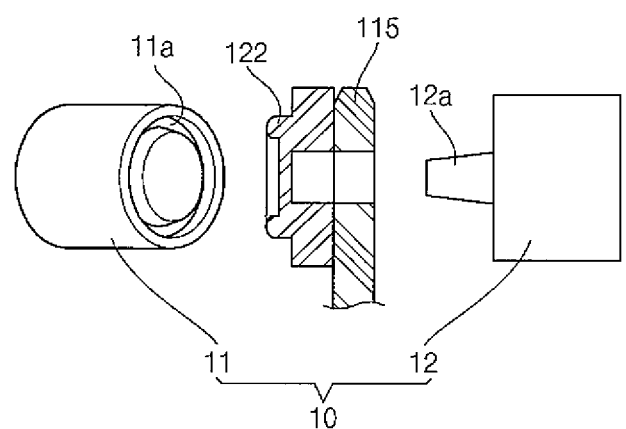
FIG. 5 is a cross-sectional view illustrating a clinching device (e.g., a TOX device) for coupling a second electrode terminal and a busbar shown in FIG. 1.

The pressure may be applied between the second connection part 122 and the second electrode terminal 115 using one of a clinching process (e.g., a TOX® process), a pressing process, and a riveting process. For example, the TOX process may be used, which will now be described with reference to FIG. 5. TOX is a registered trademark of Pressotechnik GmbH Corporation, Riedstrasse 4 Weingarten, Germany D-88250. As shown in FIG. 5, a TOX device 10 (e.g., a clinching device) includes a TOX die 11 (e.g., a clinching die) and a TOX tool 12 (e.g., a clinching tool). The TOX tool 12 has a cylindrical protrusion part 12a provided at an approximately central portion of the TOX tool 12. However, the shape of the protrusion part 12a is not limited to the cylindrical shape illustrated. In addition, the TOX die 11 includes a receiving groove 11a for receiving the protrusion part 12a. The receiving groove 11a may be larger than the protrusion part 12a in size.

The second connection part 122 and the second electrode terminal 115 are located (or arranged) between the TOX die 11 (e.g., a receiving part) and the TOX tool 12, and the TOX tool 12 is moved toward the TOX die 11 (e.g., pressure is applied between the TOX tool 12 and the TOX die 11). Then, the second connection part 122 and the second electrode terminal 115 are indented to have shapes corresponding to the protrusion part 12a and the receiving groove 11a, respectively, to be coupled to each other. Here, a groove B (see FIG. 4B) shaped to correspond to the protrusion part 12a of the TOX tool 12 is formed in the second electrode terminal 115 and a protrusion shaped to correspond to the receiving groove 11a of the TOX die 11 may be formed in the second connection part 122.

As described above, the second electrode terminal 115 and the second connection part 122 are deformed (e.g., thermally deformed) by applying pressure thereto using a pressing device to be coupled to each other. Therefore, in the battery pack 100 according to the present invention, because the busbar 120 and the second electrode terminal 115, which are made of different kinds of metals, are coupled to each other using pressure, connection failures due to complexities of welding different kinds of metals can be prevented. In addition, in the battery pack 100 according to the present invention, because the busbar is made of a single metal, the material cost can be reduced and the manufacturing of the battery pack can be more easily facilitated.

Although the battery pack of an example embodiment of the present invention has been described in detail hereinabove, it should be understood that many variations and modifications of the basic inventive concept herein described, which may appear to those skilled in the art, will still fall within the spirit and scope of the present invention as defined by the appended claims and their equivalents.

What is claimed is:

1. A battery pack comprising:
a plurality of secondary batteries, each comprising:
a first electrode terminal having a planar surface parallel with a top surface of a cap plate; and
a second electrode terminal protruding above the top surface of the cap plate and having a planar first surface facing perpendicular to the top surface of the cap plate and a second surface that is opposite to the first surface; and
a plurality of busbars, each electrically coupling the first electrode terminal of one of the secondary batteries and the second electrode terminal of an adjacent one of the secondary batteries, and each comprising a first connection part integrally formed with a second connection part, the first connection part being coupled to the first electrode terminal, and the second connection part being coupled to the second electrode terminal,
wherein the second connection part of the busbars and the first surface or the second surface of the second electrode terminals are forcibly deformed to be coupled to each other in a press-fit connection,
wherein the first connection part of the busbars are welded to the planar surface of first electrode terminals, and
wherein a portion of each of the busbars between the first connection part and the second connection part is bent.

2. The battery pack of claim 1, wherein the first and second surfaces of the second electrode terminal extend parallel with a widthwise direction of the cap plate.

3. The battery pack of claim 1, wherein the first connection part and the second connection part of the busbar are perpendicular to each other.

4. The battery pack of claim 1, wherein the busbar and the second electrode terminal are coupled to each other by a clinching process, a pressing process, or a riveting process.

5. The battery pack of claim 1, wherein the busbar and the second electrode terminal comprise metals that are different from each other.

6. The battery pack of claim 1, wherein the busbar has a protrusion extending from a surface of the busbar, and the second electrode terminal has a recess that corresponds to the protrusion of the busbar.

7. The battery pack of claim 6, wherein the busbar and the first electrode terminal comprise the same metal.

8. The battery pack of claim 7, wherein the busbar and the first electrode terminal comprise aluminum or an aluminum alloy.

9. The battery pack of claim 1, wherein each of the plurality of secondary batteries further comprises an electrode assembly comprising a first electrode plate electrically coupled to the first electrode terminal and a second electrode plate electrically coupled to the second electrode terminal; and a case accommodating the electrode assembly therein and having a top opening.

10. The battery pack of claim 9, wherein the cap plate seals the top opening of the case, and the first electrode terminal and the second electrode terminal protrude from the cap plate.

11. The battery pack of claim 1, wherein the first electrode terminal and the second electrode terminal have shapes that are different from each other.

12. A method of forming a battery pack comprising a plurality of secondary batteries and a plurality of busbars, each of the secondary batteries comprising a cap plate, a first electrode terminal, and a second electrode terminal, the method comprising:
arranging the secondary batteries along a line such that the first electrode terminal of one of the secondary batteries is adjacent to the second electrode terminal of an adjacent one of the secondary batteries; and
electrically coupling adjacent ones of the secondary batteries to each other with a busbar,
wherein the electrically coupling of the ones of the adjacent secondary batteries comprises welding a first connection part of the busbar to the first electrode terminal of one of the adjacent secondary batteries and coupling a second connection part of the busbar to the second electrode terminal of another one of the adjacent secondary batteries by applying pressure to the second connection part and the second electrode terminal to deform them to be in a press-fit connection, wherein the first connection part and the second connection part of the busbar are integrally formed with each other, and wherein the first connection part of the busbar extends parallel to a surface of the cap plate, and the second connection part of the busbar extends perpendicularly to the surface of the cap plate.

13. The method of claim 12, wherein the busbars and the first electrode terminals comprise the same metal, and the busbars and the second electrode terminals comprise metals that are different from each other.

14. The method of claim 12, wherein the busbar and the second electrode terminal are coupled to each other by a clinching process, a pressing process, or riveting process.

15. The method of claim 12, wherein the first electrode terminal has a planar surface parallel with a top surface of the cap plate, wherein the second electrode terminal protrudes above the top surface of the cap plate, and the second electrode terminal has a planar first surface facing perpendicular to the top surface of the cap plate and a second surface that is opposite to the first surface, and wherein the first connection part of the busbar is welded to the planar surface of the first electrode terminal, and the second connection part of the busbar is in the press-fit connection with the first surface or the second surface of the second electrode terminal.

* * * * *